Patented Mar. 18, 1952

2,589,960

UNITED STATES PATENT OFFICE 2,589,960

RECOVERY OF OLEFIN HYDROCARBONS

Gardner C. Ray, Bartlesville, Okla., assignor to Phillips Petroleum Company, a corporation of Delaware No Drawing. Application November 7, 1947, Serial No. 784,769

19 Claims. (Cl. 260—677)

This invention relates to the separation of olefinic hydrocarbons from hydrocarbon mixtures containing olefinic hydrocarbons and saturated hydrocarbons. In one of its aspects it relates to a process for recovering ethylene from gaseous mixtures containing the same. In another of its specific aspects it relates to an improved reagent for the separation of olefins from saturated hydrocarbons.

The process of this invention comprises the contacting of a hydrocarbon mixture containing olefinic and paraffinic hydrocarbons with a solution of a cuprous salt dissolved in orthophenetidine. Contacting is conducted under such contions that substantial amounts of olefinic hydrocarbons are dissolved. The cuprous solution containing dissolved olefinic hydrocarbons is separated from the residual hydrocarbon or hydrocarbons and passed to a stripping zone. The olefin or olefins are recovered from the solution in a relatively pure state by applying heat and/or reducing pressure in this zone.

It has long been known that olefins react with cuprous salts in aqueous or nonaqueous media to yield easily decomposable addition products, while paraffin hydrocarbons do not. This reactivity of olefins with cuprous salts has been applied to the separation of olefins from paraffins. Because of the very low solubility of most cuprous salts in water, various aqueous and nonaqueous solvents have been utilized to dissolve the cuprous salts. Known processes using aqueous media have employed hydrochloric acid or ammonia to bring appreciable amounts of the cuprous salt into solution. The use of these solvents has proven unsatisfactory for several reasons. For example, if hydrochloric acid is used, much corrosion of equipment is suffered. If ammonia is employed, special procedures and equipment are required to prevent loss of ammonia during absorption and evolution of the olefins.

The use of aqueous or nonaqueous solutions of cuprous salts dissolved in organic nitrogen bases or phenols has been proposed as a means of overcoming the aforementioned difficulties attendant to the use of aqueous cuprous solutions for olefin recovery (Evans, U. S. Patent 2,376,239; Robey, U. S. Patent 2,245,719; Imperial Chemicals Ltd., French Patent 797,470; Joshua and Stanley, U. S. Patent 2,005,500).

The principal object of the present invention is to provide an improved process and reagent for the separation and/or recovery of olefins. Another object is to provide an improved process and reagent for recovering mono-olefins from saturated hydrocarbons. Another object is to provide an improved process and reagent for recovering ethylene from gaseous mixtures containing the same in admixture with saturated hydrocarbons such as methane, ethane and propane, with or without hydrogen. Another object is to provide an improved process and reagent for recovering diolefins, especially aliphatic conjugated diolefins, such as butadiene, isoprene and piperylene, from admixture with saturated hydrocarbons. Numerous other objects will hereinafter appear.

In its broadest aspect my invention is a process for separating olefins from admixture with saturated hydrocarbons which comprises contacting the hydrocarbon mixture containing the olefin and the saturated hydrocarbon with a solution of a cuprous salt in orthophenetidine.

Ordinarily the process of my invention is carried out in such manner as not only to accomplish separation of the olefin from the saturated hydrocarbon initially in admixture therewith but also to effect recovery of the olefin in concentrated form. The recovery of the olefin is usually effected by subjecting the olefin-containing solution resulting from the contacting step and after separation of said solution from the undissolved hydrocarbon, which separation is ordinarily carried out by simply withdrawing the olefin-containing solution from the scrubbing zone, to at least one of pressure reduction or heating to cause liberation of the dissolved olefin. The olefin is probably held in the form of a soluble olefin-cuprous salt complex or addition compound which is capable of being dissociated by reducing the pressure or applying heat or both.

Generally speaking, the conditions under which the contacting or absorption step is conducted are such that the olefin-containing hydrocarbon feed is in the gaseous state. As will be obvious, this may be insured by the use of a temperature above the critical temperature or by the use of a pressure below the critical pressure where use of a pressure equal to or greater than the critical pressure would result in condensation of the hydrocarbon at the temperature employed. In some cases it may be desirable to expedite maintenance of the hydrocarbon in the gaseous phase by admixture with an inert non-condensible gas if the feed hydrocarbon mixture contains an insufficient amount of such a gas. Examples of such a gas are methane, ethane, hydrogen, nitrogen. The gas should be oxygen-free and inert toward either the hydrocarbon mixture or the reagent and should have substantially no solubility in the reagent. The amount of such gas is preferably sufficiently great to lower the condensation temperature or dew-point of the hydrocarbon mixture to a value substantially below the temperature employed in the absorption step.

I have discovered that orthophenetidine dissolves unexpectedly large quantities of cuprous salts (in excess of 20 per cent). I have further found that the resulting solutions have an unexpectedly high capacity for dissolving olefin hydrocarbons and an inertness toward paraffins. This capacity is a distinct advantage, since smaller-scale equipment may be used to accomplish a given olefin-paraffin separation. It is especially advantageous when the concentration of the olefin to be recovered is comparatively low. The mixture to which the process is applied may consist of a single paraffin and one or more olefin hydrocarbons or of a single olefin and one or more paraffin hydrocarbons. Thus ethylene may be separated from methane, ethane, propane and/or butane, and ethylene, propylene and butylenes, butadiene, etc., may be separated from methane, ethane, propane, and/or butanes. The terms "olefinic" and "olefin" are intended to embrace open-chain diolefins (especially the aliphatic conjugated diolefins) as well as open-chain olefins (i. e., aliphatic mono-olefins). In some cases both a mono-olefin and a diolefin may be present and may be recovered together by the process of the present invention. The term "saturated hydrocarbon," as used herein, includes in its broadest meaning both the acyclic and alicyclic paraffin hydrocarbons, but generally has reference to the acyclic paraffins since the alicyclic paraffins are seldom found in admixture with the acylic diolefins and mono-olefins. This process may be applied to the separation of the components of normally liquid as well as those of normally gaseous olefin-paraffin mixtures. Thus pentenes may be separated from pentanes, hexenes from hexanes, etc.

As stated above, the process of my invention is preferably executed with the hydrocarbon mixture in the gaseous phase. Any suitable method of contacting the gases with the liquid solution of cuprous salt may be employed. The preferred procedure is to contact countercurrently the hydrocarbon mixture in the gas phase with the liquid in a tower provided with bubble plates or other contact elements such as sprays, packing, baffles, etc.

If desired, means may be provided for mechanical agitation of the scrubbing liquid (i. e., the reagent solution) and the olefin-containing gas in order to greatly increase the rate of dissolving olefin. The rate of dissolving olefin may be slow in the absence of such mechanical agitation. Instead of positively agitating, as by means of a rotated stirrer, I may use any suitable means for attaining fine subdivision of the gas and scrubbing solution and the desired high degree of intimacy of contact therebetween. Thus the scrubbing tower may be provided with orifices, porous plates, perforated trays, baffle, the usual bubble trays, etc. In some cases a combination of stirring and baffling may be employed. Rapidly rotating turbines which trap the gas and divide it into small bubbles more readily absorbed by the liquid may be used.

Generally the solution of cuprous salt in orthophenetidine is injected continuously into the top of the scrubbing tower and allowed to descend therein in intimate countercurrent contact with the ascending gas, the hydrocarbon feed being injected continuously into the bottom of the tower. The gas withdrawn from the top is essentially or completely free from olefin. The olefin-containing scrubbing liquid is withdrawn continuously from the bottom of the tower. If it is not completely saturated with respect to olefin, a suitable portion may be recycled and introduced into the tower at a point which may be substantially below the point of introduction of the fresh reagent at the top. In this way the concentration of olefin may be caused to attain the desired level in the stream passed to the desorption step. The balance of the stream withdrawn from the bottom of the absorber or, in the case where no such recycling is employed, the entire stream so withdrawn is passed to the desorption step where it is treated to effect the liberation of the dissolved olefin in concentrated form. The thus regenerated reagent solution, after cooling if necessary, is recycled to the absorber.

The conditions of absorption may vary within wide limits so long as they are such that the olefin is preferentially dissolved while the saturated hydrocarbon is not dissolved to any substantial extent. The pressure and temperature are the two principal conditions which will be varied to obtain the desired result. Obviously the absorption pressure and temperature are adjusted or selected with reference to one another. In general the absorption pressure may range from atmospheric to any desired superatmospheric pressure. Pressures ranging from atmospheric to 500 pounds per square inch gage will generally be used. Superatmospheric pressures are preferred because the quantity of olefin dissolved is greatly increased by elevated pressure. Thus, prssures of from 50 to 500 pounds per square inch gage are often preferred.

The preferred maximum absorption temperature is about 30° C. The temperature may range from 30° C. downwardly to any economically feasible temperature, say −21° C. The preferred temperature is from 10 to 25° C. since this does not entail excessive refrigeration costs. The lower the temperature of absorption the greater the absorption. However since orthophenetidine freezes at −21° C., temperatures as low as this or lower cannot be used without causing solidification of the reagent. In order to keep the reagent liquid at temperatures of this order, it is necessary to use a low-freezing diluent for the reagent. Any suitable inert organic liquid which is miscible with orthophenetidine and has a sufficiently low freezing point may be used for this purpose. Examples are methyl alcohol, ethyl alcohol, acetone, etc. The anti-freeze should be inert with respect to orthophenetidine, the cuprous salt and the components of the hydrocarbon feed.

Desorption of the olefins is suitably conducted by increasing the temperature of the olefin-enriched solution to 40 to 100° C. or by releasing or reducing the pressure on the solution. A combination of these methods is very satisfactory. In some cases the pressure to which the solution is reduced may be considerably below atmospheric, obtained by drawing a vacuum on the desorption zone. The regenerated solution may be reused in a continuous process.

Acetylene and hydrogen sulfide precipitate copper from cuprous salt-orthophenetidine solutions. Removal of these compounds from raw gas mixtures prior to absorption in cuprous salt-orthophenetidine solutions is therefore desirable.

The strength of the solution of cuprous salt in orthophenetidine, i. e., the percentage by weight of cuprous salt based on the weight of the solution, may vary within wide limits. Ordinarily it will range from 5 per cent to saturation under the conditions of temperature employed in the absorption zone. The more nearly saturated the solution the more economical is the process because the greater is the capacity of the solution for dissolving olefins and the lower is the rate of circulation and the smaller the equipment required for a given throughput of olefin-containing feed. A saturated solution of cuprous chloride in o-phenetidine at room temperature will contain over 20 per cent of cuprous chloride.

In some cases an excess of cuprous salt over the amount required to give a saturated solution may be employed with good results. The excess should be finely divided to give a smooth slurry.

The reagent generally consists of the cuprous salt, such as cuprous chloride, and orthophenetidine. However, in unusual situations an antifreeze liquid may be included in the reagent as explained above.

The reagent is usually in the form of a simple solution of the cuprous salt dissolved in orthophenetidine. However, in some circumstances I may dispose the solution on a suitable adsorptive or absorptive solid carrier such as pumice, diatomaceous earth, sawdust, etc., in which case the method of operation will be modified somewhat from that employed when the liquid reagent is used.

In some commercial installations it may be desirable to reduce the partial pressure of olefin in equilibrium with a cuprous salt-o-phenetidine solution by passing an inert gas into the system. Such a case may be illustrated as follows: olefins are concentrated from a lean olefin stream (such as refinery gases) by combining them with the reagent of the present invention. The "fat" reagent containing the absorbed olefin is then passed to a stripping or desorption zone, where an isoparaffin is introduced. The off-gas from the stripper or desorber would then constitute a olefin-isoparaffin stream suitable for use as an alkylation feed stock. The ratio of olefin to isoparaffin is readily controlled by the temperature and pressure used in the stripping operation.

Many advantages flow from the practice of the present invention. The solution is not corrosive. The solution is stable since it does not contain any highly volatile components. No loss of ammonia is involved as has been the case when ammoniacal solutions are used. The solution exhibits excellent thermal stability. The solubility of paraffin hydrocarbons in the solution is low. The solubility of the olefin hydrocarbons is extremely high. Hence, sharp olefin-paraffin separations result. Complete recovery of the dissolved olefin by desorption is readily accomplished in a simple and economical manner. The solution is long-lasting so that chemical consumption is low.

In the following examples, the cuprous salt employed was cuprous chloride. This particular cuprous salt was used because of its relatively low cost and ready availability. Other cuprous salts such as cuprous nitrate, iodide, bromide, formate, acetate, butyrate, etc., or any other cuprous salt which is soluble in orthophenetidine may, however, be used within the scope of this invention.

*Example*

A solution prepared by dissolving 2.081 gms. of solid cuprous chloride in 8.0 cc. of o-phenetidine was contacted with pure ethylene at one atmosphere pressure at 25° C. Equilibrium was reached when 211.0 cc. of ethylene had been absorbed. This volume of gas corresponds to an absorption coefficient of 26.4 volumes of gas per volume of solution under the conditions of the experiment and to about 0.4 mole of ethylene dissolved per mole of cuprous chloride. This solution represents a concentration of 20 per cent cuprous chloride by weight.

Gaseous paraffin hydrocarbons are soluble in a 20 per cent cuprous chloride-orthophenetidine solution in the order of 1.5 to 2.0 volumes of paraffin per volume of cuprous chloride-orthopenetidine solution under the conditions of one atmosphere pressure and 25° C. temperature. This illustrates the low capacity of cuprous chloride-orthophenetidine solutions for dissolving paraffin hydrocarbons.

It will be obvious to those skilled in the art that the process of our invention can be varied within wide limits, as for example, alteration of operating pressures, temperatures, concentrations, etc., may be different than those given herein, as dictated by conditions or desired operation, and yet remain within the intended spirit and scope of our invention.

I claim:

1. The process for separating olefins from admixture with saturated hydrocarbons which comprises contacting the hydrocarbon mixture containing the olefin and the saturated hydrocarbon with a reagent comprising a cuprous salt in orthophenetidine.

2. The process for separating olefins from admixture with saturated hydrocarbons and recovering the olefins in concentrated form which comprises contacting the hydrocarbon mixture containing the olefin and the saturated hydrocarbon with a reagent comprising a solution of a cuprous salt in orthophenetidine under such conditions that the olefin is preferentially dissolved in said solution while the saturated hydrocarbon remains undissolved, separating the resulting olefin-containing solution from the undissolved hydrocarbon, and desorbing the olefin from said resulting solution.

3. The process for separating olefins from admixture with saturated hydrocarbons and recovering the olefins in concentrated form which comprises intimately contacting the hydrocarbon mixture containing the olefin and the saturated hydrocarbon in the gaseous state with a reagent comprising a solution of a cuprous salt in orthophenetidine under such conditions that the olefin is preferentially dissolved in said solution while the saturated hydrocarbon remains undissolved, separating the resulting olefin-containing solution from the undissolved hydrocarbon, and desorbing the olefin from said resulting solution by subjecting said solution to at least one of pressure reduction and heating.

4. The process for separating olefins from admixture with saturated hydrocarbons and recovering the olefins in concentrated form which comprises intimately contacting the hydrocarbon mixture containing the olefin and the saturated hydrocarbon in the gaseous state with a reagent comprising a solution of cuprous chloride in orthophenetidine under such conditions that the olefin is preferentially dissolved in said solution while the saturated hydrocarbon remains undissolved, separating the resulting olefin-containing solution from the undissolved hydrocarbon, and desorbing the olefin from said resulting solution by subjecting said solution to at least one of pressure reduction and heating.

5. The process for separating mono-olefins from admixture with paraffin hydrocarbons which comprises contacting the hydrocarbon mixture containing the mono-olefin and the paraffin hydrocarbon with a reagent comprising a solution of a cuprous salt in orthophenetidine.

6. The process for separating mono-olefins from admixture with paraffin hydrocarbons and recovering the mono-olefins in concentrated form which comprises contacting the hydrocarbon mixture containing the mono-olefin and the saturated hydrocarbon with a reagent comprising a solution of a cuprous salt in orthophenetidine under such conditions that the mono-olefin is preferentially dissolved in said solution while the paraffin hydrocarbon remains undissolved, separating the resulting mono-olefin-containing solution from the undissolved paraffin hydrocarbon and desorbing the mono-olefin from said resulting solution.

7. The process for separating mono-olefins from admixture with paraffin hydrocarbons and recovering the mono-olefins in concentrated form which comprises intimately contacting the hydrocarbon mixture containing the mono-olefin and the saturated hydrocarbons in the gaseous state with a reagent comprising a solution of a cuprous salt in orthophenetidine under such conditions that the mono-olefin is preferentially dissolved in said solution while the paraffin hydrocarbon remains undissolved, separating the resulting mono-olefin-containing solution from the undissolved paraffin hydrocarbon, and desorbing the mono-olefin from said resulting solution by subjecting such solution to at least one of pressure reduction and heating.

8. The process for separating mono-olefins from admixture with paraffin hydrocarbons and recovering the mono-olefins in concentrated form which comprises intimately contacting the hydrocarbon mixture containing the mono-olefin and the paraffin hydrocarbon in the gaseous state with a reagent comprising a solution of cuprous chloride in orthophenetidine under such conditions that the mono-olefin is preferentially dissolved in said solution while the paraffin hydrocarbon remains undissolved, separating the resulting mono-olefin-containing solution from the undissolved paraffin hydrocarbon, and desorbing the mono-olefin from said resulting solution by subjecting said solution to at least one of pressure reduction and heating.

9. The process for separating ethylene from admixture with at least one paraffin hydrocarbon which comprises contacting the hydrocarbon mixture containing the ethylene and the paraffin hydrocarbon with a reagent comprising a solution of a cuprous salt in orthophenetidine.

10. The process for separating ethylene from admixture with at least one paraffin hydrocarbon and recovering the ethylene in concentrated form which comprises intimately contacting the hydrocarbon mixture containing the ethylene and the paraffin hydrocarbon in the gaseous state with a reagent comprising a solution of a cuprous salt in orthophenetidine under such conditions that the ethylene is preferentially dissolved in said solution while the paraffin hydrocarbon remains undissolved, separating the resulting ethylene-containing solution from the undissolved hydrocarbon, and desorbing the ethylene from said resulting solution by subjecting said solution to at least one of pressure reduction and heating.

11. The process for separating ethylene from admixture with at least one paraffin hydrocarbon and recovering the ethylene in concentrated form which comprises intimately contacting the hydrocarbon mixture containing the ethylene and the paraffin hydrocarbon with a reagent comprising a solution of cuprous chloride in orthophenetidine under such conditions that the ethylene is preferentially dissolved in said solution while the paraffin hydrocarbon remains undissolved, separating the resulting ethylene-containing solution from the undissolved paraffin hydrocarbon, and desorbing the ethylene from said resulting solution by subjecting said solution to at least one of pressure reduction and heating.

12. The process for separating an aliphatic diolefin from admixture with a paraffin hydrocarbon which comprises contacting the hydrocarbon mixture containing the diolefin and the paraffin hydrocarbon with a reagent comprising a solution of a cuprous salt in orthophenetidine.

13. The process for separating an aliphatic diolefin from admixture with at least one paraffin hydrocarbon and recovering the aliphatic diolefin in concentrated form which comprises intimately contacting the hydrocarbon mixture containing the aliphatic diolefin and the paraffin hydrocarbon in the gaseous state with a reagent comprising a solution of a cuprous salt in orthophenetidine under such conditions that the aliphatic diolefin is preferentially dissolved in said solution while the paraffin hydrocarbon remains undissolved, separating the resulting aliphatic diolefin-containing solution from the undissolved hydrocarbon, and desorbing the aliphatic diolefin from said resulting solution by subjecting said solution to at least one of pressure reduction and heating.

14. The process for separating an aliphatic diolefin from admixture with at least one paraffin hydrocarbon and recovering the aliphatic diolefin in concentrated form which comprises intimately contacting the hydrocarbon mixture containing the aliphatic diolefin and the paraffin hydrocarbon with a reagent comprising a solution of cuprous chloride in orthophenetidine under such conditions that the aliphatic diolefin is preferentially dissolved in said solution while the paraffin hydrocarbon remains undissolved, separating the resulting aliphatic diolefin-containing solution from the undissolved paraffin hydrocarbon, and desorbing the aliphatic diolefin from said resulting solution by subjecting said solution to at least one of pressure reduction and heating.

15. The method for the preparation of an alkylation feed stock from a hydrocarbon stock containing a mono-olefin and a normal saturated paraffin hydrocarbon comprising contacting the hydrocarbon stock containing a mono-olefin and a normal saturated paraffinic hydrocarbon with a reagent comprising a solution of a cuprous salt in orthophenetidine under such conditions that the mono-olefin is preferentially dissolved in said solution while the paraffin hydrocarbon remains undissolved, separating the resulting mono-olefin-containing solution from the undissolved paraffin hydrocarbon and desorbing the mono-olefin from said resulting solution by subjecting said solution to at least one of pressure reduction and heating while passing therethrough a stripping agent comprising an isoparaffinic hydrocarbon, and removing the off gas containing said mono-olefin and isoparaffin as an alkylation feed stock.

16. A selective solvent for dissolving and removing olefins from mixtures of olefins and saturated hydrocarbons consisting of a major portion of orthophenetidine, from 5 per cent of a cuprous salt selected from the group consisting of cuprous nitrate, chloride, bromide, iodide, formate, acetate and butyrate based on the combined weights of the cuprous salt and said orthophenetidine to a saturated solution of said cuprous salt in said orthophenetidine, and a minor but effective amount of an organic antifreeze component.

17. A selective solvent for dissolving and removing olefins from mixtures of olefins and saturated hydrocarbons consisting of a major portion of orthophenetidine, from 5 per cent of a cuprous salt selected from the group consisting of cuprous nitrate, chloride, bromide, iodide, formate, acetate and butyrate based on the combined weights of the cuprous salt and said orthophenetidine to a saturated solution of said cuprous salt in said orthophenetidine.

18. A selective solvent for dissolving and removing olefins from mixtures of olefins and saturated hydrocarbons consisting of a major portion of orthophenetidine and from 5 per cent of cuprous chloride based on the combined weights of said cuprous chloride and said othophenetidine to a saturated solution of said cuprous chloride in said orthophenetidine.

19. A selective solvent for dissolving and removing olefins from mixtures of olefins and saturated hydrocarbons consisting of a major portion of orthophenetidine, from 5 per cent of a cuprous salt selected from the group consisting of cuprous nitrate, chloride, bromide, iodide, formate, acetate and butyrate based on the combined weights of the cuprous salt and said orthophenetidine to a saturated solution of said cuprous salt in said orthophenetidine, and a minor but effective amount of an organic antifreeze component consisting of methyl alcohol.

GARDNER C. RAY.

REFERENCES CITED

The following references are of record in the file of this patent:

UNITED STATES PATENTS

| Number | Name | Date |
|---|---|---|
| 2,395,529 | Arnold | Feb. 26, 1946 |
| 2,395,957 | Breuer | Mar. 5, 1946 |